Patented Feb. 19, 1952

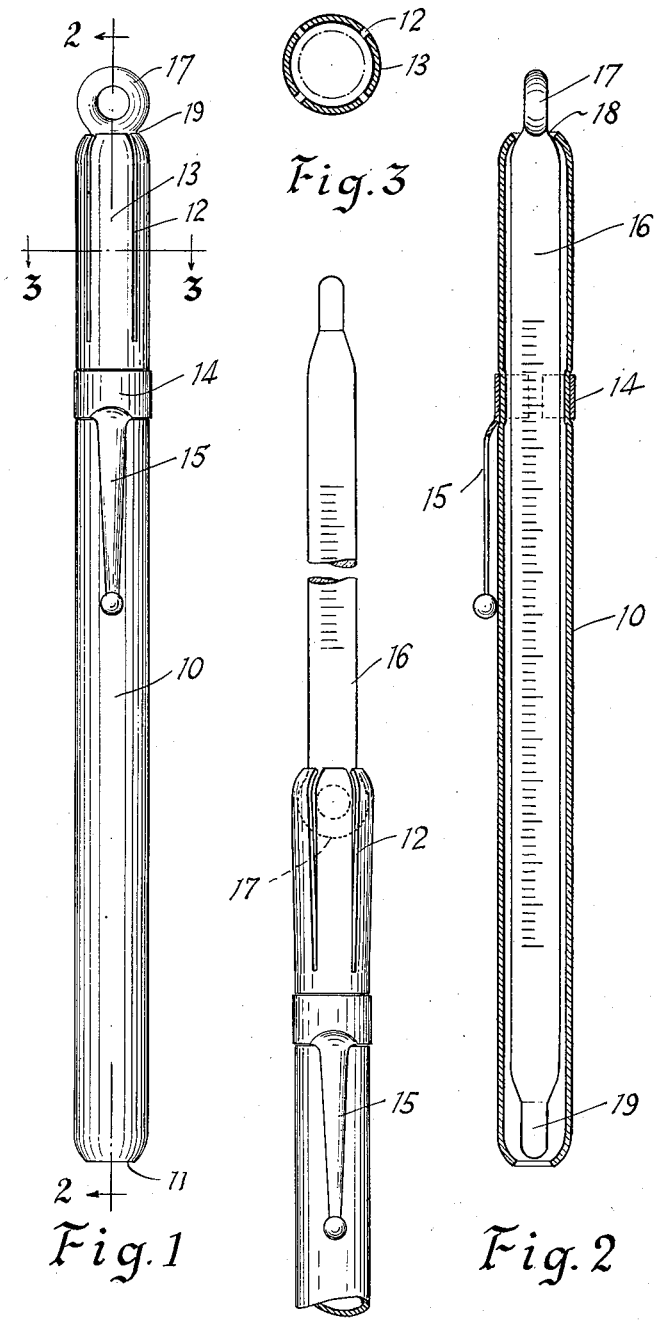

2,586,448

UNITED STATES PATENT OFFICE 2,586,448

THERMOMETER CASE

Joseph J. Weber and Robert M. Wilhelm, New York, N. Y., assignors to Miller & Weber, Inc.

Application November 18, 1949, Serial No. 128,064

4 Claims. (Cl. 206—165)

This invention relates to thermometer cases such as may serve as a carrier for a thermometer and as a protection thereto.

Thermometer cases have, of course, been known in the past, but their use has been attended with some disadvantages. For example, some were unduly complex in construction so as to be expensive in manufacture and sometimes awkward in use. According to the present invention, a thermometer case of striking simplicity is provided which nevertheless performs its required and additional functions with reliability and accuracy. Thus, the case is tubular throughout and is formed with a slotted upper end which replaces a conventional cap. The case is fabricated of a resilient metal so that the slotting of the upper end produces spring fingers which serve as a closure for the case.

The thermometer which is accommodated by the case of the instant invention is formed with a slight enlargement at its upper end which limits the entrance of the thermometer into the case and further provides a grasping member. However, the size of the enlargement may be such that the thermometer may be reversed and the enlargement inserted directly into the spring finger opening and there firmly retained. The purpose of this expedient is to utilize the case as an extension holder for the thermometer. This feature is particularly desirable when taking the temperature of hot liquids or the like in order to protect the fingers of the user.

The thermometer case of the instant invention may be widely used in connection with industrial pocket thermometers, and it is provided with a pocket clip by which the case may be retained in a user's pocket.

The invention will be further understood from the following description and drawings in which:

Fig. 1 is a front elevational view of a thermometer case constructed according to the instant invention and enclosing a thermometer.

Fig. 2 is a cross-sectional view as taken along the lines 2—2 of Fig. 1.

Fig. 3 is a cross-sectional view as taken along the lines 3—3 of Fig. 1.

Fig. 4 is a fragmentary view, partly broken away, illustrating the use of the thermometer case as an extension holder.

The tubular body 10 of the thermometer case may be formed of any resilient metal or the like. The lower end 11 is generally open so as to minimize danger of breakage of the thermometer tip end. The upper end of the case is formed with slots 12 which provide a series of annularly disposed spring fingers 13. The case is swaged inwardly at both ends and the spring fingers 13 accordingly curl inwardly to serve as a closure and to effect a secure grasp on the thermometer when serving as an extension holder as will hereinafter be made clear. At the termination of the spring fingers, the body 10 is formed with an annular depression which serves as the seat for band 14 of clip 15.

The thermometer 16 is illustrated as being the etched stem type of industrial pocket thermometers. In the form shown, its upper end is provided with a ring 17 which serves as a grasping member and also permits the thermometer, with or without the case, to be suspended from a hook or the like. Ring 17 is of an outer diameter slightly larger than the normal diameter of the elongated tubular body 10. Ring 17 curves inwardly where it meets the body of the thermometer so as to form a shoulder 18 serving as a normal rest point for the free ends of the spring fingers 13.

The opening formed by the spring fingers 13 is normally smaller than the body diameter of the thermometer. The tip end 19 of the thermometer is, however, smaller than such opening so that it may be conveniently inserted therein. As the body of the thermometer is pushed into the case, the spring fingers spread and finally reach the rest shoulder 18 as illustrated in Fig. 1.

The case may be secured to a user's pocket by means of the clip 15 in the same manner as a conventional fountain pen. The user need not remove the case when the thermometer is to be used since he may merely grasp the enlargement 17 and withdraw the thermometer from the case. The thermometer may thereafter be reinserted in the same manner.

When the case is to be employed as an extension holder, as when taking the temperature of hot liquids or the like, the ringed or upper end of the thermometer is inserted into the opening formed by the spring fingers and such spring fingers thereby effect a secure grasp on the upper end of the thermometer as illustrated in Fig. 4. The case is then held in the hand while the thermometer may be applied as required.

The spring nature of the case closure permits a single case to accommodate thermometers of different diameters within a reasonable range. Furthermore, refills may be inserted without any difficulty, even should the enlarged or grasping end member of a refill vary considerably from that illustrated, since such enlarged end does not, in the principal use described, normally enter the case nor is it directly grasped thereby. In the use of the case as an extension holder, it is apparent that the grasping end member of the thermometer must be of a size to be accommodated within the limits of spread of the spring fingers. While there has been shown what at present is considered to be a preferred embodiment of the invention, it is obvious that numerous changes and omissions may be made without departing from its spirit.

What is claimed is:

1. The combination with a thermometer having a body of substantially uniform diameter, an enlarged grasping end member and a shoulder below of a case therefor, said case being of resilient metal and being slotted through its upper end to provide elongated spring fingers parallel to the longitudinal axis of the case, the free ends of said spring fingers curving inwardly to define an upper end opening having a diameter normally smaller than the diameter of said thermometer body so as to normally seat themselves on said shoulder of the thermometer.

2. The combination according to claim 1 and wherein said spring fingers are free to spread radially to enlarge said upper end opening, said enlarged grasping end member being of a size to permit insertion thereof within said upper end opening when enlarged by the spreading action of said spring fingers whereby said case may serve as an extension holder for said thermometer.

3. The combination with a thermometer having a body of substantially uniform diameter, an enlarged grasping end member and a shoulder below, of a case therefor, said case being of resilient metal and being slotted through its upper end to provide elongated spring fingers parallel to the longitudinal axis of the case, the free ends of said spring fingers curving inwardly to define an upper end opening having a diameter normally smaller than the diameter of said thermometer body so as to normally seat themselves on said shoulder of the thermometer, said enlarged grasping end member being integral with the thermometer and being ring-shaped.

4. The combination with a thermometer having a body of substantially uniform diameter and an enlarged grasping end member, of a case therefor, said case being of resilient material and being slotted through its upper end to provide spring fingers extending substantially parallel to the longitudinal axis of the case, the free ends of said spring fingers curving inwardly to define an opening having a diameter normally smaller than said diameter body.

JOSEPH J. WEBER.
ROBERT M. WILHELM.

REFERENCES CITED

The following references are of record in the file of this patent:

UNITED STATES PATENTS

| Number | Name | Date |
| --- | --- | --- |
| 753,711 | Kellett | Nov. 1, 1904 |
| 2,294,001 | Ritter | Aug. 25, 1942 |
| 2,450,089 | Hiergesell et al. | Sept. 28, 1948 |